(12) United States Patent
Chen

(10) Patent No.: US 8,356,624 B2
(45) Date of Patent: Jan. 22, 2013

(54) SELF-OPERATED PRESSURE TRANSMISSION TYPE OF PRESSURE REDUCING VALVE WITH CORRUGATED PIPE

(76) Inventor: Baochun Chen, Jiangsu (CN)

( * ) Notice: Subject to any disclaimer, the term of this patent is extended or adjusted under 35 U.S.C. 154(b) by 373 days.

(21) Appl. No.: 12/874,378

(22) Filed: Sep. 2, 2010

(65) Prior Publication Data

US 2011/0057137 A1  Mar. 10, 2011

(30) Foreign Application Priority Data

Sep. 9, 2009 (CN) .......................... 2009 1 0034922

(51) Int. Cl.
*F16K 31/12* (2006.01)
(52) U.S. Cl. .............................. 137/505.22; 137/505.21
(58) Field of Classification Search .................. 137/505, 137/505.13, 505.21, 505.22
See application file for complete search history.

(56) References Cited

U.S. PATENT DOCUMENTS

| 339,757 | A | * | 4/1886 | Fulton ..................... 137/505.22 |
| 623,733 | A | * | 4/1899 | Evans ............................ 105/386 |
| 1,917,698 | A | * | 7/1933 | Carson, Jr. ............... 137/505.22 |
| 2,111,230 | A | * | 3/1938 | Toussaint ........................ 251/28 |
| 2,389,412 | A | * | 11/1945 | Carlton ................... 137/115.18 |
| 2,885,173 | A | * | 5/1959 | Dobrick ....................... 251/61.3 |
| 5,971,013 | A | * | 10/1999 | Beau et al. ............... 137/505.37 |

* cited by examiner

*Primary Examiner* — Stephen M Hepperle
*Assistant Examiner* — Ian Paquette
(74) *Attorney, Agent, or Firm* — Rabin & Berdo, P.C.

(57) ABSTRACT

A self-operated pressure transmission type of pressure reducing valve with corrugated pipe has an upper cover, a cylinder, a lower cover, a sealing board, a sealing sleeve, a first and second nut, and an upper valve rod. The pressure reducing valve needs no external driving force. It only needs a power-saving product which can automatically adjust the pressure according to the pressure change of the adjusted object. It has multiple functions such as measuring, implementing and controlling pressure, and it solves the problems in the operation process of the conventional pressure reducing valve.

4 Claims, 1 Drawing Sheet

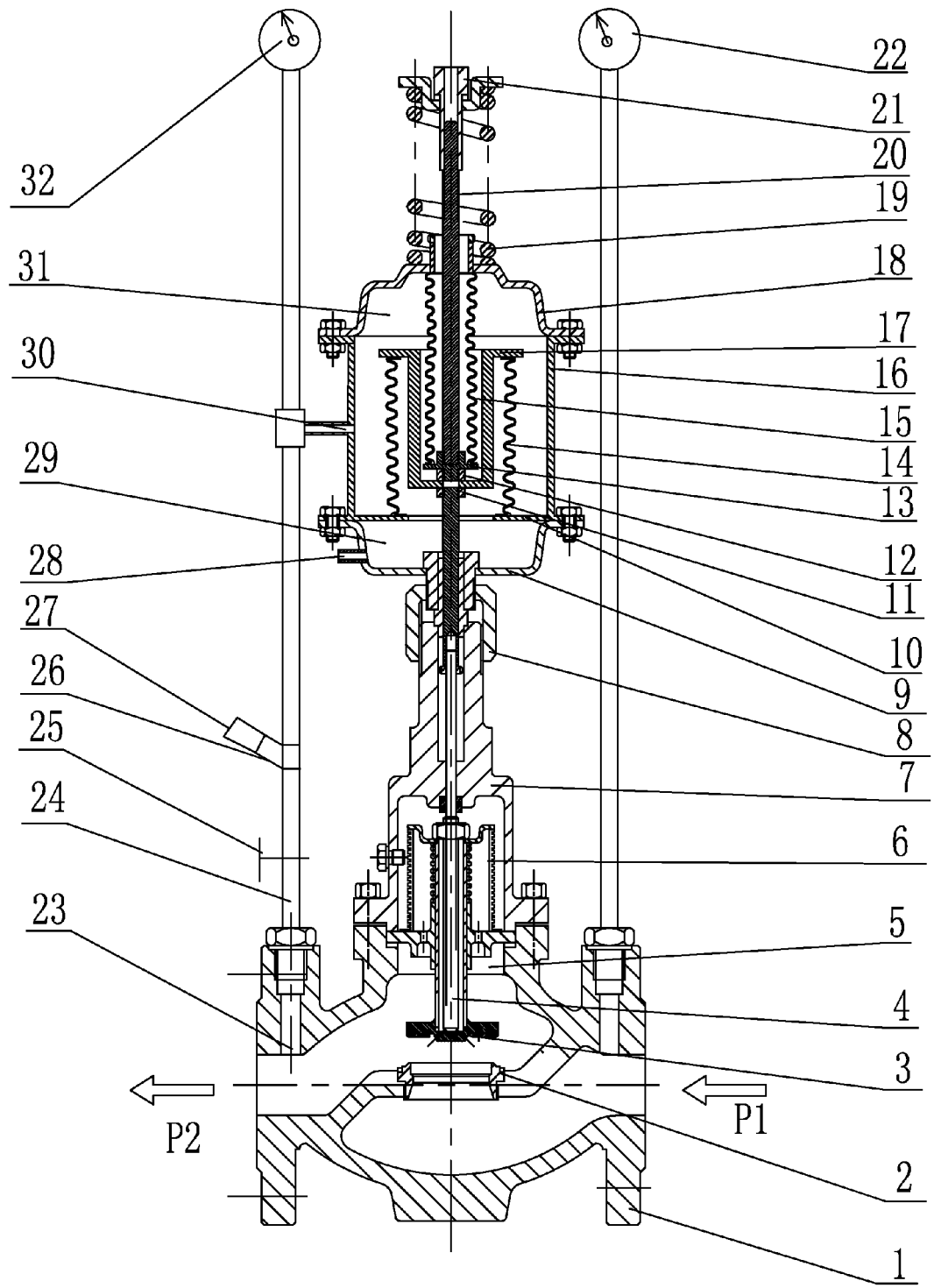

SELF-OPERATED PRESSURE TRANSMISSION TYPE OF PRESSURE REDUCING VALVE WITH CORRUGATED PIPE

FIELD OF THE INVENTION

The present invention relates to a pressure reducing valve structure.

BACKGROUND OF THE INVENTION

The fluid control of the piping system in the fields of petroleum, chemicals, metallurgy and heating and warming needs to apply the effect of pressure reducing, pressure stabilizing, pressure staticizing and differential pressure control, however the conventional pressure reducing valves have such shortages:

Thin film plate type: it is easy to age, it can not resist temperature over 150° C. and can not resist pressure over 1.6 MPa, the stroke control of the valve flap is short, the extent of the pressure adjustment is narrow.

Spring type: it can not realize pressure stabilizing and pressure staticizing. The range of the application field is narrow.

Piston type: the piston is easy to be stuck, the friction force is great, it is not sensitive, the adjustment extent is narrow, it only can reduce the dynamic pressure but can not reduce the static pressure, the control is not reliable, the pressure adjustment is not precise.

Corrugated pipe type: the design of the traditional corrugated pipe is not advanced.

Lever type: the range of the application field is narrow.

SUMMARY OF THE INVENTION

The object of the present invention is to design a self-operated pressure transmission type of pressure reducing valve with corrugated pipe, which has a reliable working stability, long working life, wide application range and needs no external driving force.

The present invention disposes a valve seat on a valve body, and a spool is disposed on the valve seat and connected to the lower end of a lower valve rod, said lower valve rod passes through and disposed in a valve cover above the valve seat, the upper end of said lower valve rod is connected to an upper valve rod with connecting member; said upper valve rod is movable up and down and supported by a housing, the upper end of said upper valve rod is connected to the upper end of said housing with an regulating nut and a spring, a pressure guiding pipe is connected between said housing and the valve seat; said housing comprises an upper cover, a cylinder and a lower cover, a lower housing inlet is connected to the side wall of the lower cover, an upper housing inlet is connected to the side wall of the upper cover or the side wall of the cylinder, the upper cover and the lower cover are respectively and hermetically connected to the upper and the lower ends of the cylinder, a sealing board is transversely disposed between the cylinder and the lower cover, the center of said sealing board has a through hole; a sealing sleeve is disposed in the cylinder, a corrugated pipe which bears high pressure is disposed outside of the sealing sleeve, the upper and lower ends of the corrugated pipe are respectively and hermetically connected to the sealing sleeve and the sealing board, a first nut for connecting the upper valve rod is fixed above the bottom of said sealing sleeve, and a second nut for connecting the lower valve rod is fixed beneath the bottom of said sealing sleeve; the lower valve rod is thread joint with the second nut; the first nut is thread joint with the lower end of a sealing nut of the corrugated pipe of the upper valve rod; the sealing corrugated pipe of the upper valve rod is disposed between the sealing sleeve and the upper valve, the upper end of which is hermetically connected in the upper cover, the lower end of which is hermetically fixed to the sealing nut of the corrugated pipe of the upper valve rod; said corrugated pipe which bears high pressure, sealing corrugated pipe of the upper valve rod, sealing sleeve and the cylinder are respectively coaxially disposed with the upper valve rod.

In operation, there is a space between the upper housing and the lower housing for the adjustment of up and down movement.

The present invention applies the corrugated pipe which bears high pressure to seal and isolate the upper and lower housing, and applies the sealing corrugated pipe of the upper valve rod to seal and isolate the upper and lower valve rod, and applies the corrugated pipe made of the stainless steel of 316L type or other alloy as the pressure transmission type of adjustment and balancing element, the pressure of the object through the upstream or the downstream is transmitted to the upper housing or the lower housing through the guiding pipe equipped with a drain and pressure releasing filter, the corrugated pipe is pressed to stretch out and draw back, and causes the spool move, so the quantity of flow is changed to adjust the upstream pressure or the downstream pressure and to adjust the differential pressure, thereby it can realize the effects of pressure reducing, pressure stabilizing, pressure staticizing and controlling differential pressure by self-operated.

The present invention needs no external driving force, it only needs a power-saving product which can automatically adjust the pressure according to the pressure change of the pressure adjusted object, it has multiple functions such as measure, implement and control, and it will solve the problems in the operation process of the conventional pressure reducing valve. It has the advantages such as high temperature resistant ($\leq 400°$ C.), high pressure resistant ($\leq 25$ MPa), the adjustment extent is wide, it can realize the precise control of pressure stabilizing, pressure staticizing and differential pressure; it is adaptable for horizontal-mounted or reverse-mounted, the leakage is completely avoided, the corrugated pipe made of the stainless steel 316L or other alloy is applied as the pressure transmission type of adjustment and balancing element. It has the features such as reliable working stability, long working life and wide application range. The present invention is widely used the fluid pressure of the piping system in the fields of petroleum, chemicals, metallurgy and heating and warming: the effect of pressure reducing, pressure stabilizing and pressure staticizing and the differential pressure control can be realized, the adaptable objects can be water, air, steam, ammonia, nitrogen, acetic acid and corrosive objects such as urea, the adaptable temperature is from $-253°$ C. to $+650°$ C.

Further, the outer periphery of the sealing board of the present invention is hermetically fixed to the inner side wall of the cylinder.

Said upper valve rod is coaxially disposed with said lower valve rod.

BRIEF DESCRIPTION OF THE DRAWINGS

FIG. 1 is a structural view of the present invention.

DETAILED DESCRIPTION OF THE EMBODIMENTS

As showed in FIG. 1, a valve seat 2 is disposed in the valve body 1, a spool 3 is disposed above the valve seat and connected to a lower end of the lower valve rod 4, after the lower valve rod 4 passing through the supporting shelf 5, then it will pass through the sealing corrugated pipe 6 of the lower valve rod and disposed therein, further it is hermetically connected to the sealing corrugated pipe 6 of the lower valve rod, the upper end of the lower valve rod 4 sequentially passes through and disposed in the valve cover 7, connecting nut 8, lower cover 9 and sealing board 10. The connecting nut 8 is connected between the lower valve rod 4 and an implementing mechanism which controls the up and down movement of the spool.

The housing is mainly composed of the upper cover 18, housing 16 and the lower cover 9, a lower housing inlet 28 is connected to the side wall of the lower cover 9, an upper housing inlet 30 is connected to the side wall of the upper cover 18 or the side wall of the cylinder 16, the upper cover 18 and the lower cover 19 are respectively and hermetically connected to the upper and lower ends of the cylinder 16. A sealing board 10 is transversely disposed between the cylinder 16 and the lower cover 9, the center of the sealing board 10 has a through hole for the lower valve rod 4 to freely move up and down, moreover, the outer periphery of the sealing board 10 is hermetically fixed to the side wall of the cylinder 16.

A sealing sleeve 17 is disposed in the cylinder 16, a corrugated pipe 14 which bears high pressure is disposed outside of the sealing sleeve 17, the upper and lower ends of the corrugated pipe 14 are respectively and hermetically connected to the sealing sleeve 17 and the sealing board 10.

A first nut 12 for connecting the upper valve rod is welded above the bottom of the sealing sleeve 17, and a second nut 11 for connecting the lower valve rod is welded beneath the bottom of the sealing sleeve 17, the upper end of the lower valve rod 4 is connected in the second nut 11, the first nut 12 is connected to the bolt of the lower end of the sealing nut 13 of the corrugated pipe of the upper valve rod with the inner thread of the first nut 12, the lower end of the upper valve rod 20 is thread joint with the sealing nut 13 of the corrugated pipe of the upper valve rod.

A sealing corrugated pipe 15 of the upper valve rod is disposed between the sealing sleeve 17 and the upper valve rod 20, the upper end of which is hermetically connected to the upper cover 18, the lower end of which is hermetically fixed to the sealing nut 13 of the corrugated pipe of the upper valve rod.

The upper valve rod 4 is coaxially disposed with the lower valve rod 20, the corrugated pipe 14 which bears high pressure, the sealing corrugated pipe 15 of the upper valve rod, the sealing sleeve 17 and the cylinder 16 are respectively coaxially disposed with the upper valve rod 4 or the lower valve rod 20.

The upper valve rod 20 passes through and disposed in the upper cover 18, the upper end of which is connected to the spring 19 and the regulating nut 21.

A piezometer 22 is connected to the inlet of upstream of the valve.

A valve outlet 23 is disposed on the passageway of the downstream of the valve, a pressure guiding pipe 24 is connected to the valve outlet 23 and is disposed with a ball valve 25, a filter 26, and a drain and pressure releasing valve 27, the upper end of the pressure guiding pipe 24 is connected to a piezometer 32 of the outlet of the downstream of the valve.

When the downstream pressure is adjusted, the pressure on the pressure guiding pipe 24 is connected to the upper housing inlet 30 through a three-way pipe (as showed in FIG. 1).

When the upstream pressure is adjusted, the pressure on the pressure guiding pipe 24 is connected to the lower housing inlet 28 through a three-way pipe.

The working principle of the present invention is:

(1) the working principle of the downstream pressure adjustment: (please refer FIG. 1)

After the object passes through the valve 1 with a low-ingress and high-egress manner and throttled by the valve seat 2 and the spool 3, the upstream pressure P1 is transferred into the downstream pressure P2, at the same time, the downstream pressure P2 is transmitted into the upper housing 31 of the implementing device with the pressure guiding pipe 24 and then acts on the corrugated pipe 14 which bears high pressure, the corrugated pipe 14 shrinks, the applied force is balanced with the reaction force of the spring 19, so the relative position of the valve seat 2 and the spool 3 is determined, the downstream pressure P2 is controlled. When the downstream pressure P2 is increased, the shrinking force on the corrugated pipe 14 by the downstream pressure P2 will be increased. At this moment, the shrinking force is greater than the reaction force of the spring, so the spool 3 will close toward the valve seat, until the shrinking force is balanced with the reaction force of the spring 19. Meanwhile, the flow area between the valve seat 2 and the spool 3 is decreased, and the flow resistance is increased, so the downstream pressure P2 is decreased to the predetermined value. According to the same principle, when the downstream pressure P2 is decreased, the acting direction will be opposite to the original direction, that is the working principle of the downstream pressure adjustment. The predetermined value of the downstream pressure P2 can be adjusted by adjusting the regulating nut 21.

(2) the working principle of the upstream pressure adjustment:

After the object passes through the valve 1 with a low-ingress and high-egress manner and throttled by the valve seat 2 and the spool 3, the upstream pressure P1 is transferred into the downstream pressure P2, at the same time, the upstream pressure P1 is transmitted into the lower housing 29 of the implementing device with the pressure guiding pipe 24 and then acts on the corrugated pipe 14 which bears high pressure, the corrugated pipe 14 expands, the applied force is balanced with the reaction force of the spring 19, so the relative position of the valve seat 2 and the spool 3 is determined, the upstream pressure is controlled. When the upstream pressure P1 is increased, the expanding force on the corrugated pipe 14 by the upstream pressure P1 will be increased. At this moment, the expanding force is greater than the reaction force of the spring, so the spool 3 will move opposite the valve seat 2, until the expanding force is balanced with the reaction force of the spring 19. Meanwhile, the flow area between the valve seat 2 and the spool 3 is increased, and the flow resistance is decreased, so the upstream pressure P1 is decreased to the predetermined value. According to the same principle, when the upstream pressure P1 is decreased, the acting direction will be opposite to the original direction, that is the working principle of the upstream pressure adjustment. The predetermined value of the upstream pressure P1 can be adjusted by adjusting the regulating nut 21.

The working principle of the differential pressure control:

After the object is throttled through the valve 1 with a low-ingress and high-egress manner and enters the controlled device, the differential pressure of the controlled device are respectively leaded into the upper housing 31 and the lower housing 29 of the valve, a pushing force is generated in upper housing 31 and the lower housing 29 and balanced with the reaction force of the spring 19, so the relative position of the valve seat 2 and the spool 3 is determined, then the value of the differential pressure $\Delta P$ is decided by the relative position. When the controlled differential pressure is changed, the balance of the forces is broken up, so the spool 3 is driven to move, and the resistance coefficient of the valve is changed by the movement of the spool 3, so the value of the controlled differential pressure will be controlled as a predetermined value. That is the working principle of the differential pressure control. The predetermined value of the differential pressure can be adjusted by adjusting the regulating nut 21.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A self-operated pressure transmission type of pressure reducing valve with corrugated pipe, comprising a valve body disposed with a valve seat, and a spool is disposed on the valve seat and connected to the lower end of a lower valve rod, said lower valve rod passes through and is disposed in a valve cover above the valve seat, the upper end of said lower valve rod is connected to an upper valve rod with a connecting member; said upper valve rod is movable up and down and supported by a housing, the upper end of said upper valve rod is connected to the upper end of said housing with a regulating nut and a spring, a pressure guiding pipe is connected between said housing and the valve seat; wherein said housing comprises an upper cover, a cylinder and a lower cover, a lower housing inlet is connected to the side wall of the lower cover, an upper housing inlet is connected to the side wall of the upper cover or the side wall of the cylinder, the upper cover and the lower cover are respectively and hermetically connected to the upper and the lower ends of the cylinder, a sealing board is transversely disposed between the cylinder and the lower cover, the center of said sealing board has a through hole; a sealing sleeve is disposed in the cylinder, a corrugated pipe which bears high pressure is disposed outside of the sealing sleeve, the upper and lower ends of the corrugated pipe are respectively and hermetically connected to the sealing sleeve and the sealing board, a first nut for connecting the upper valve rod is fixed above the bottom of said sealing sleeve, and a second nut for connecting the lower valve rod is fixed beneath the bottom of said sealing sleeve; the lower valve rod is threadably connected to the second nut; the first nut is threadably connected to the lower end of a sealing nut of a sealing corrugated pipe of the upper valve rod; the sealing corrugated pipe of the upper valve rod is disposed between the sealing sleeve and the upper valve cover, the upper end of which is hermetically connected in the upper cover, the lower end of which is hermetically fixed to the sealing nut of the sealing corrugated pipe of the upper valve rod; said corrugated pipe which bears high pressure, sealing corrugated pipe of the upper valve rod, sealing sleeve and the cylinder are respectively coaxially disposed with the upper valve rod.

2. The self-operated pressure transmission type of pressure reducing valve with corrugated pipe according to claim 1, wherein said upper valve rod and the lower valve rod are coaxially disposed.

3. The self-operated pressure transmission type of pressure reducing valve with corrugated pipe according to claim 1, wherein the outer periphery of the sealing board is hermetically fixed to the inner side wall of the cylinder.

4. The self-operated pressure transmission type of pressure reducing valve with corrugated pipe according to claim 3, wherein said upper valve rod and the lower valve rod are coaxially disposed.

* * * * *